United States Patent [19]

Yost

[11] Patent Number: 4,846,284
[45] Date of Patent: Jul. 11, 1989

[54] BEAN CUTTING KNIFE

[76] Inventor: N. James Yost, P.O. Box 127, 312 So. First St., Severance, Colo. 80546

[21] Appl. No.: 150,640

[22] Filed: Feb. 1, 1988

[51] Int. Cl.⁴ .............................................. A01B 35/25
[52] U.S. Cl. ................................... 172/772.5; 172/720
[58] Field of Search ...................... 172/752, 753, 772.5, 172/720; 56/295, 229; 30/349, 357

[56] References Cited

U.S. PATENT DOCUMENTS

| 516,544 | 3/1894 | Meeter | 172/753 |
|---|---|---|---|
| 1,104,291 | 7/1914 | Clark . | |
| 1,181,480 | 5/1916 | Ring | 172/753 |
| 1,505,668 | 8/1924 | Prigel | 172/753 |
| 1,632,958 | 6/1927 | Frieburg | 172/772 |
| 1,662,570 | 3/1928 | Fowler | 172/720 X |
| 1,781,851 | 11/1930 | Lang | 172/720 |
| 2,845,972 | 8/1958 | Hedtke | 146/108 |
| 3,664,103 | 5/1972 | McNair | 56/298 |
| 4,375,148 | 3/1983 | Beck | 56/295 |
| 4,445,315 | 5/1984 | Roszkowski | 56/295 |
| 4,454,921 | 6/1984 | Schlicker | 172/772.5 |
| 4,611,460 | 9/1986 | Parker | 56/295 |

FOREIGN PATENT DOCUMENTS

| 2818137 | 11/1979 | Fed. Rep. of Germany . | |
| 2930712 | 2/1981 | Fed. Rep. of Germany . | |
| 819338 | 10/1961 | United Kingdom | 56/289 |

Primary Examiner—Richard J. Johnson
Attorney, Agent, or Firm—Dean P. Edmundson

[57] ABSTRACT

An improved bean cutting knife is described which includes a replaceable cutting blade. The knife support includes a recessed area along its working edge. The cutting blade fits into the recessed area and is detachably secured with threaded fasteners, for example. When the cutting blade becomes worn it can be removed and then replaced with a new cutting blade.

11 Claims, 3 Drawing Sheets

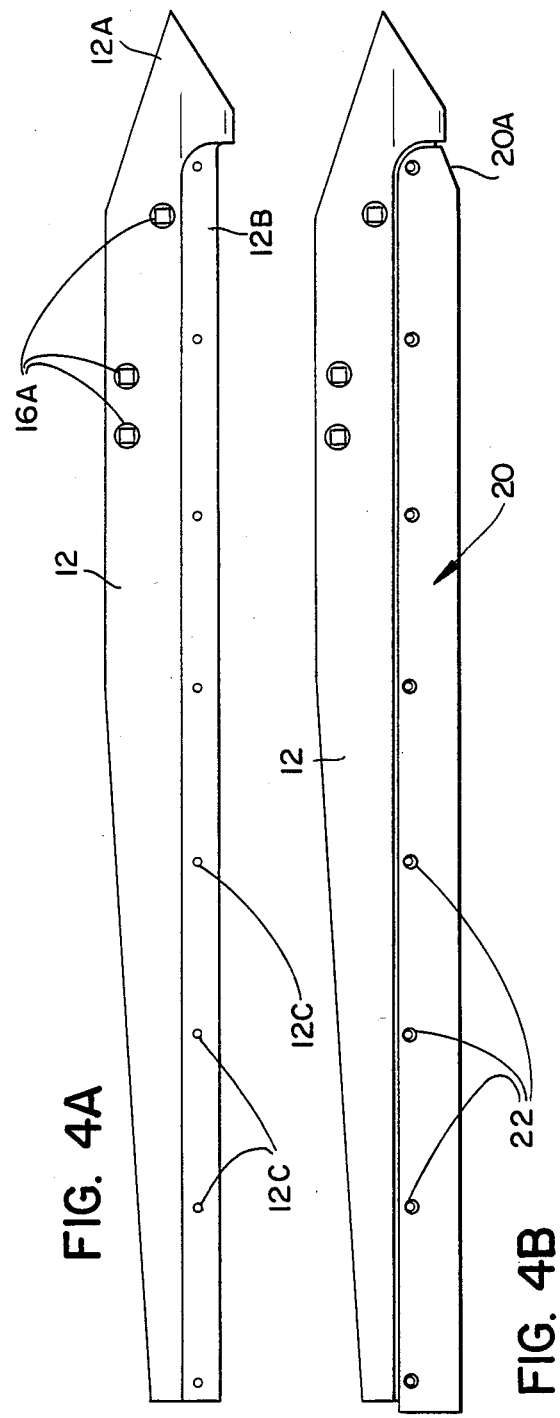

BEAN CUTTING KNIFE

FIELD OF THE INVENTION

This invention relates to agricultural implements. More particularly, this invention relates to bean cutting implements. Even more particularly, this invention relates to bean cutting knives used on such implements.

BACKGROUND OF THE INVENTION

Bean cutting implements conventionally include bean cutting knives which are mounted on depending shanks. The cutting knives are intended to move through the soil to cut the bean stalks below the ground level.

After a period of use the working edge of the cutting knife becomes worn. When the soil is rocky or sandy the knife wears fairly quickly. Eventually the entire cutting knife must be replaced. This is quite expensive.

There has not heretofore been proposed a bean cutting knife which eliminates these problems. The following patents were found in a prior art search: U.S. Pats. Nos. 1,104,291; 2,845,972; 3,664,103; 4,375,148; 4,445,315; and 4,611,460; British Pat. No. 879,338; German OLS Nos. 2818137 and 2930712. None of such patents provide a system suitable for bean cutting knives.

SUMMARY OF THE PRESENT INVENTION

In accordance with the present invention there is provided an improved bean cutting knife for use on a bean cutting implement. The cutting knife includes a recess along its working edge and a replaceable knife blade member positioned in the recess and detachably secured to the knife. The knife blade provides the cutting edge for cutting the bean stalks. As it becomes worn the blade may be easily detached and replace with a new cutting blade.

The system of this invention provides for quick and easy replacement of cutting blades without the necessity of replacing the entire knife. The cutting blade may be provided with any desired degree of hardness.

Other advantages of the system of this invention will be apparent from the following detailed description and appended drawings.

BRIEF DESCRIPTION OF THE DRAWINGS

The invention is described in more details hereinafter with reference to the accompanying drawings, wherein like reference characters refer to the same parts throughout the several views and in which:

FIGS. 4A and 4B are top views illustrating the bean cutting knife and replaceable blade of the invention.

DETAILED DESCRIPTION OF THE INVENTION

Figure 1:
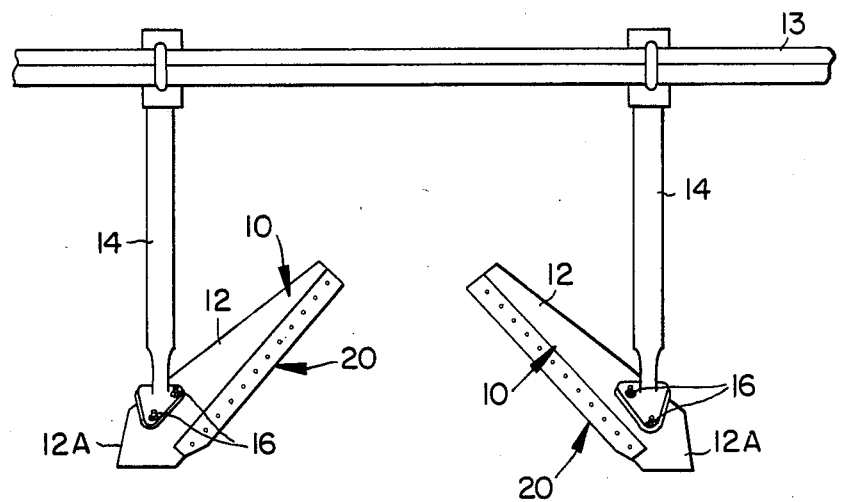
FIG. 1 is a front view illustrating bean cutting knives attached to the lower end of a shank of an implement.
Figure 2:
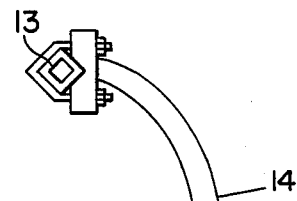
FIG. 2 is a side elevational view of the knife and shank shown in FIG. 1.
Figure 2:
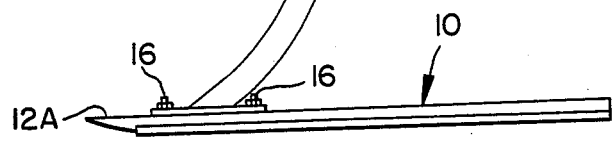

In the drawings there is illustrated a bean cutting knife 10 of the invention comprising an elongated knife body member 12 and replaceable blade member 20 which is detachably secured to the knife body to provide a working cutting edge for the knife. The knife body member 12 is secured to the lower end of a depending shank 14 carried by beam 13 of the implement. Typically the implement is mounted on a tractor.

The knife 10 is oriented at an angle with respect to direction of travel of the implement through the field, and each knife is adapted to be lowered into the ground and drawn through the soil in a manner such that each knife cuts through beam stems or stalks in a single row. Each knife includes a pointed leading end 12A. Bolts 16 may be used to secure each knife to the lower end of the shank 14. The knife includes openings 16A therethrough to facilitate such securement.

Figure 3:
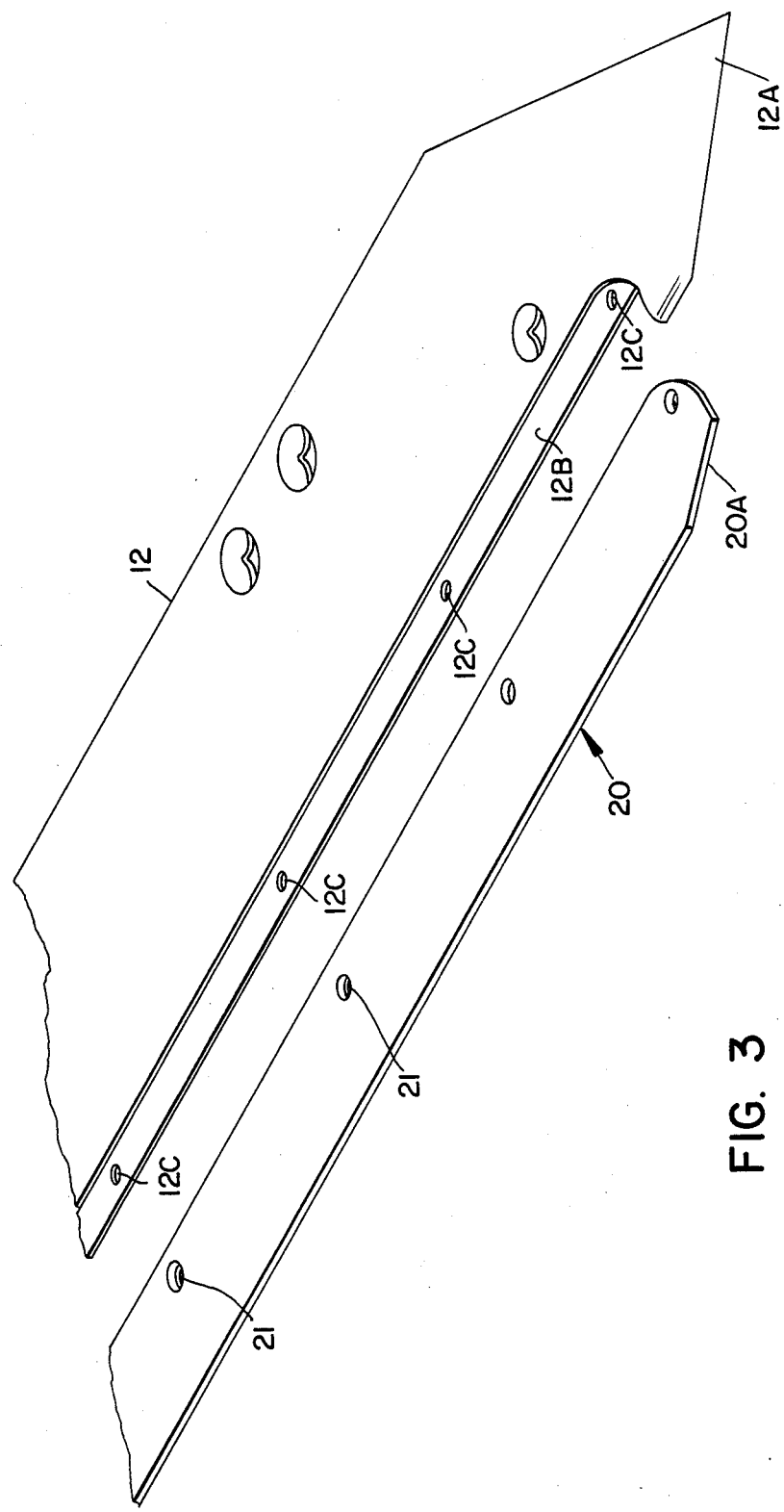
FIG. 3 is a perspective exploded view of a bean cutting knife and replaceable blade of the invention.

The working edge of each knife includes a recessed area, as illustrated in FIGS. 3, 4A and 4B, in which the replaceable blade member 20 is seated. The recessed area preferably includes ledge 12B which extends along the length of the recess. The ledge provides support for the replaceable blade. Apertures 12C extend through ledge 12B to facilitate attachment of the blade 20. The apertures may be threaded, if desired. For example, when the blade is to be attached by means of screws 22, it is preferable for apertures 12C to be threaded.

The length of the knife body may vary. The depth and length of the recessed area may also vary. Preferably the leading end of the recess is rearwardly of the pointed end 12A of knife body 12, as illustrated. For example, the recess begins about five inches behind the end 12A.

The elongated replaceable blade member 20 fits into the recessed area and is detachably secured to the ledge 12B (for example, by means of screws, bolts, rivets, or the like). The blade preferably has a uniform thickness (e.g., about 0.1 to 0.2 inch, with 0.125 inch being most preferred).

The blade provides the cutting edge for cutting the beans as the knife is drawn through the soil. Preferably the blade is tough and durable so that it will not chip or break easily and so that it will wear reasonably well. Preferably the hardness of the blade is greater than that of the knife body.

The width of the blade is preferably in the range of about 2 to 3 inches. The length; of the blade may also vary, for example, from about 40 to 43 inches for the typical bean knife. Other lengths could be used, of course, for knives of different lengths.

It is also preferably for the working edge of the blade member to project or extend outwardly past the edge of the knife so that there is a good amount of wearing surface presented. As the knife is used to cut beans, the working edge of the knife slowly wears away. Because the blade has a uniform thickness it remains sharp. When the blade edge becomes worn to the point where it must be replaced, the worn blade member can be easily detached from the knife body and discarded. A new blade member can then be secured to the knife body. No replacement of the knife body is required.

A preferred shape for the blade member is an elongated strip having generally parallel longitudinal edges. This shape is easily manufactured and can be used on either left-handed or right-handed knives. Preferably the front corner 20A is angled, as illustrated. One edge preferably includes apertures 21.

Preferably the thickness of the blade approximates the distance which the ledge 12B is set below the upper surface of the knife body. Thus, the upper surface of the blade is approximately flush with the upper surface of the knife body.

Although reference is made herein to bean cutting knives, the techniques of the invention are equally applicable to any elongated knives where a replacement blade is used. For example, the cutting knives may also be used in connection with other crops such as peanuts, onions, or the like where a blade is drawn through the soil.

Other variants are possible without departing from the scope of the present invention:

What is claimed is:

1. An improved bean cutting knife of the type adapted to be detachably secured to an agricultural implement and drawn through the soil to cut bean stalks below ground level, wherein said cutting knife is elongated and includes a leading end, a trailing end, and a working edge, wherein the improvement comprises:
   (a) a recess in said knife extending along said working edge; wherein said recess extends from a point behind said leading end to said trailing end of said knife;
   (b) a replaceable knife blade member positioned in said recess and detachably secured to said knife.

2. A bean cutting knife in accordance with claim 1, wherein said blade is harder than said knife.

3. A bean cutting knife in accordance with claim 1, wherein said blade is secured to said knife by means of threaded fasteners.

4. A bean cutting knife in accordance with claim 1, wherein said blade has a width in the range of about 2 to 3 inches.

5. A bean cutting knife in accordance with claim 1, wherein the length of said blade is in the range of about 40 to 43 inches.

6. A bean cutting knife in accordance with claim 1, wherein said blade has a thickness of about 0.1 to 0.2 inch.

7. A bean cutting implement including a frame and a plurality of downwardly depending shank members, wherein said shank members each have a bean cutting knife mounted thereon which is adapted to be drawn through the soil to cut bean stalks below ground level, wherein said cutting knife comprises:
   (a) an elongated support member including a leading end, a trailing end, and a working edge; wherein said support member further includes a recess extending along said working edge; wherein said support member is detachably secured to said shank member; wherein said recess extends from a point behind said leading end of said support member to said trailing end of said support member;
   (b) a replaceable knife blade member positioned in said recess and detachably secured to said support member.

8. An implement in accordance with claim 7, wherein said blade is secured to said support member by means of threaded fasteners.

9. An implement in accordance with claim 7, wherein said blade has a width in the range of about 2 to 3 inches.

10. An implement in accordance with claim 7, wherein said blade has a length in the range of about 40 to 43 inches.

11. An implement in accordance with claim 7, wherein said blade has a thickness in the range of about 0.1 to 0.2 inch.

* * * * *